(12) United States Patent
Zhang et al.

(10) Patent No.: US 10,473,919 B2
(45) Date of Patent: Nov. 12, 2019

(54) PORTABLE 3D SCANNING SYSTEM FOR 3D SURFACE RECONSTRUCTION

(71) Applicant: KONICA MINOLTA LABORATORY U.S.A., INC., San Mateo, CA (US)

(72) Inventors: Yongmian Zhang, Union City, CA (US); Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 172 days.

(21) Appl. No.: 15/859,246

(22) Filed: Dec. 29, 2017

(65) Prior Publication Data

US 2019/0204588 A1  Jul. 4, 2019

(51) Int. Cl.
| | |
|---|---|
| *G06K 9/00* | (2006.01) |
| *G02B 26/10* | (2006.01) |
| *G06T 7/50* | (2017.01) |
| *G06T 7/80* | (2017.01) |
| *G06T 15/10* | (2011.01) |
| *G01B 21/04* | (2006.01) |
| *H04N 13/271* | (2018.01) |
| *H04N 13/282* | (2018.01) |
| *G01B 11/245* | (2006.01) |
| *G01B 11/25* | (2006.01) |
| *G06T 17/00* | (2006.01) |

(52) U.S. Cl.
CPC ............ *G02B 26/10* (2013.01); *G01B 11/245* (2013.01); *G01B 11/2513* (2013.01); *G01B 21/042* (2013.01); *G06T 7/50* (2017.01); *G06T 7/80* (2017.01); *G06T 15/10* (2013.01); *H04N 13/271* (2018.05); *H04N 13/282* (2018.05); *G06T 17/00* (2013.01); *G06T 2207/10012* (2013.01)

(58) Field of Classification Search
CPC .. G02B 26/10; G01B 11/2513; G01B 11/245; G01B 21/042; H04N 13/271; H04N 13/282; G06T 15/10; G06T 7/80; G06T 7/50; G06T 2207/10012; G06T 17/00
See application file for complete search history.

(56) References Cited

U.S. PATENT DOCUMENTS 4,702,605 A * 10/1987 Stern ................... G01B 11/2518
356/3.03
5,870,220 A    2/1999 Migdal et al.
(Continued)

*Primary Examiner* — Aaron W Carter
(74) *Attorney, Agent, or Firm* — Chen Yoshimura LLP

(57) ABSTRACT

A 3D scanning system includes a base stand, two circular arc shaped support tracks, a mounting assembly for mounting the support tracks to the base stand with one or more degrees of rotational freedom, two sensor holders mounted on the respective support track for holding two depth sensors, and a drive mechanism for driving the sensor holders to move along the respective support tracks. The mounting assembly supports relative rotation of the two support tracks and pitch and roll rotations of the support tracks. To perform a 3D scan, a stationary object is placed in front of the two depth sensors. The sensor holders are moved along the respective support tracks to different positions to obtain depth images of the objects from different angles, from which a 3D surface of the object is constructed. Prior to scanning, the two depth sensors are calibrated relative to each other.

11 Claims, 9 Drawing Sheets

(56) References Cited

U.S. PATENT DOCUMENTS

| | | | |
|---|---|---|---|
| 6,542,249 B1* | 4/2003 | Kofman | G01B 11/2513 356/601 |
| 6,974,964 B1* | 12/2005 | Wang | G01B 11/2522 250/559.29 |
| RE39,133 E * | 6/2006 | Clayton | A61B 17/7083 600/426 |
| 2002/0055082 A1* | 5/2002 | Durbin | A61C 9/00 433/29 |
| 2003/0071194 A1* | 4/2003 | Mueller | G01B 11/00 250/208.1 |
| 2003/0196557 A1* | 10/2003 | Kim | A21B 7/005 99/348 |
| 2005/0174579 A1* | 8/2005 | Notni | G01B 11/2513 356/601 |
| 2006/0276910 A1* | 12/2006 | Weber | A61B 6/12 623/23.71 |
| 2010/0004538 A1* | 1/2010 | Eilers | A61B 8/10 600/444 |
| 2011/0026669 A1* | 2/2011 | Tancredi | A61B 6/0478 378/19 |
| 2016/0242724 A1* | 8/2016 | Lavallee | A61B 6/032 |
| 2016/0287198 A1* | 10/2016 | Abramovich | A61B 6/105 |
| 2017/0292919 A1* | 10/2017 | McCollough | A61B 5/0507 |
| 2017/0296137 A1* | 10/2017 | West | A61B 6/583 |
| 2017/0353711 A1* | 12/2017 | Wayenberg | G01G 19/50 |
| 2018/0120236 A1* | 5/2018 | Lu | G01N 21/87 |
| 2018/0132939 A1* | 5/2018 | Liou | G01B 11/245 |
| 2018/0185113 A1* | 7/2018 | Gregerson | A61B 34/20 |
| 2019/0087976 A1* | 3/2019 | Sugahara | G06T 7/75 |
| 2019/0122428 A1* | 4/2019 | Walker | A63H 33/08 |
| 2019/0204588 A1* | 7/2019 | Zhang | H04N 13/282 |

\* cited by examiner

PORTABLE 3D SCANNING SYSTEM FOR 3D SURFACE RECONSTRUCTION

BACKGROUND OF THE INVENTION

Field of the Invention

This invention relates to three-dimensional (3D) imaging devices for 3D surface reconstruction, and in particular, it relates to a portable 3D scanner.

Description of Related Art 3D surface modeling utilizing depth sensing is known. 3D scanners are commercially available. In many conventional 3D modeling systems, to obtain a full 3D surface of an object, the object is required to be placed on a rotatable platform while being imaged by stationary 3D sensors. Such scanner systems tend to be complex and expensive and inconvenient to use.

A single structured light sensor has also been used for 3D shape reconstruction, which requires many partially overlapped scans of an object from different viewpoints by manually moving the sensor around the object in order to achieve a full object surface.

U.S. Pat. No. 5,870,220, entitled "Portable 3D scanning system and method for rapid shape digitizing and adaptive mesh generation," describes a portable 3D scanning system which "collects 2D-profile data of objects using a combination of a laser-stripe positioning device and a video camera which detects the images of the laser stripe reflected from the object." (Abstract.)

SUMMARY

For some types of objects such as human limbs, it is inconvenient or impractical to place the object on a rotatable platform for 3D scanning.

As to the system that uses a single depth sensor by manually moving it around the object, there are three issues. First, the difficulty of automatically aligning all scans often results in a discontinuity and insufficient accuracy for 3D surface reconstruction. Second, manually moving a single depth sensor around the object often causes the parts of object to be uncovered. Third, the capture is time consuming for an object with non-flat surface, which is not suitable for non-rigid object or an object that cannot be kept steadily for a sufficient time period. The current prediction methods for recovering the unobserved geometry of an object surface often result in a lack of fine and naturally smooth shape features.

Embodiments of the present invention provides a portable, low-cost apparatus which can achieve full 3D object surface reconstruction by utilizing depth sensing without the need of a rotatable platform.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a scanner support structure for a 3D scanning system, which includes: a base stand; two support tracks, each having a circular arc shape when viewed along a first direction; a mounting assembly for mounting the two support tracks to the base stand, the mounting assembly including a first rotational shaft extending in the first direction and engaging each support track at a proximal end, for supporting a rotation of each support track around the first rotational shaft; and two sensor holders, each being moveably mounted on one of the two support tracks and being moveable in a circular arc shaped path along the respective support track, each sensor holder having a holding structure adapted for holding a depth sensor.

In another aspect, the present invention provides a method for obtaining 3D (three-dimensional) surface data of a target object, which includes: providing a 3D scanning system, the system including: a base stand; two support tracks, each having a circular arc shape, mounted on the base stand, the two support tracks being rotatable relative to each other around a first rotation axis located near respective proximal ends of the two support tracks; two sensor holders, each being moveably mounted on one of the two support tracks and being moveable in a circular arc shaped path along the respective support track; and two depth sensors, each being held on a respective one of the two sensor holders; rotating the two support tracks around the first rotation axis to set a relative rotation angle of the two support tracks; moving the two sensor holders to respective initial positions near the respective proximal ends of the support tracks; calibrating the two depth sensors using a reference object placed in front of the two depth sensors held on the two sensor holders, by obtaining 3D surface data of the reference object using the two depth sensors at the initial positions, and processing the 3D surface data to generate calibration parameters; placing the target object in front of the two depth sensors and keeping the target object stationary; while maintaining the relative rotation angle of the two support tracks, moving the two sensor holders along the respective support tracks to a plurality of different positions and obtaining 3D surface data of the target object using the two depth sensors from the different positions; and constructing a 3D surface of the target object using the calibration parameters and the 3D surface data obtained by the two depth sensors from the different positions.

It is to be understood that both the foregoing general description and the following detailed description are exemplary and explanatory and are intended to provide further explanation of the invention as claimed.

DETAILED DESCRIPTION OF PREFERRED EMBODIMENTS

The structure of a 3D scanning system according to an embodiment of the present invention is described in detail with reference to FIGS. 1-8B.

Figure 1:
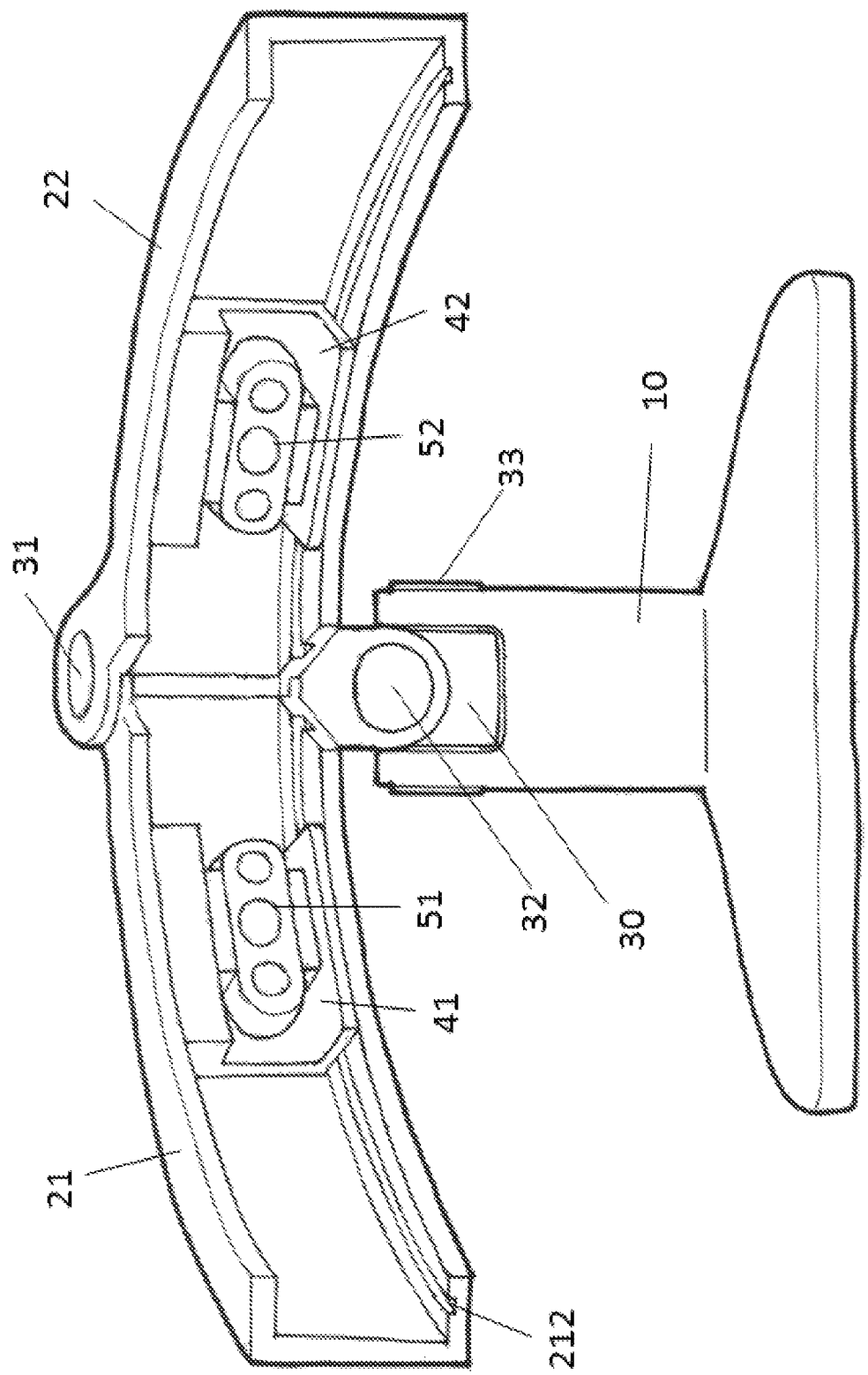
FIG. 1 is a perspective view of a 3D scanning system according to an embodiment of the present invention.

As shown in FIG. 1, which is a perspective view of the 3D scanning system, the 3D scanning system includes a base stand 10, first and second support tracks 21, 22, a mounting assembly 30 for mounting the first and second support tracks to the base stand, and first and second sensor holders 41, 42 moveably mounted on the first and second support tracks respectively. The base stand 10, the two support tracks 21, 22, the mounting assembly 30, and the two sensor holders 41, 42 form a 3D scanner support structure. FIG. 1 also shows first and second depth sensors 51, 52 respectively held on the first and second sensor holders 41, 42, but the depth sensors are not a part of the 3D scanner support structure; a use may separately obtain the depth sensors and attach them to the 3D scanner support structure to form the 3D scanning system. For example, the depth sensors may be portable/handheld structured light sensors that are commercially available. As will be described later, the sensor holders 41, 42 are configured to accommodate depth sensors of different sizes.

The first and second support tracks extend horizontally in the configuration shown in FIG. 1, and each support track has the shape of a circular arc in the top view, so that each of the first and second sensor holders 41, 42 is configured to move along the respective support track in a circular trajectory. The object being scanned is placed in front of the depth sensors 51, 52 and remains stationary, while the depth sensors are used to take measurements from multiple viewpoints by moving the sensor holders along the support tracks.

Figure 3A:
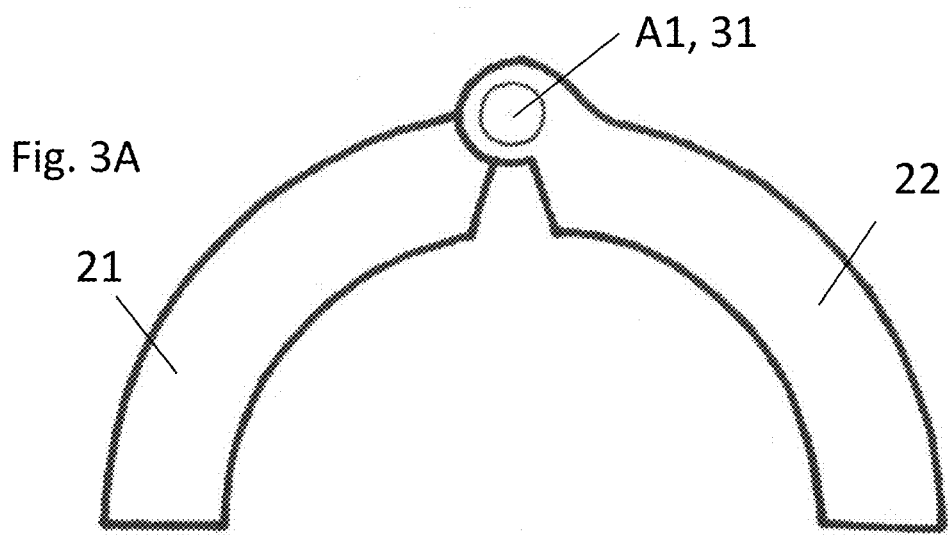
FIGS. 3A-3B are top view of the 3D scanning system, showing different configurations of the support tracks.
Figure 3B:
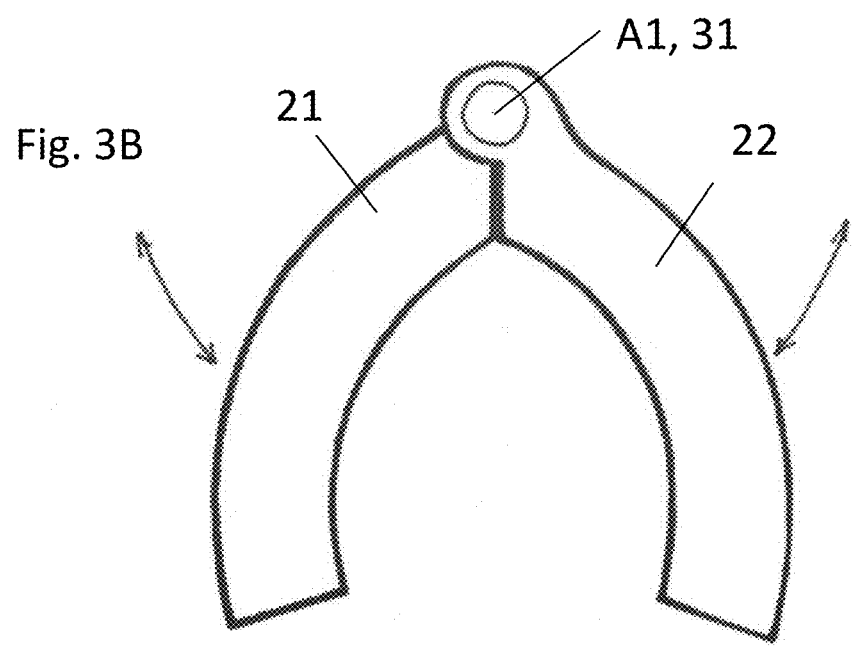

Preferably, the mounting assembly 30 is configured to mount the two support tracks 21, 22 with several degrees of rotational freedom. First, as illustrated in FIGS. 3A-3B, which are top views of the support tracks, with FIG. 3A being when the 3D scanner support structure is in the configuration shown in FIG. 1, the mounting assembly 30 supports the support tracks 21, 22 to rotate relative to each other around a first axis A1, which is the vertical axis in the configuration of FIG. 1. The relative angle between the two support tracks 21, 22 may be referred to as the "opening angle" of the two support tracks. This angle can allow the depth sensors to be closer to the object being scanned, and/or can allow the viewpoints to move behind the object.

Figure 4A:
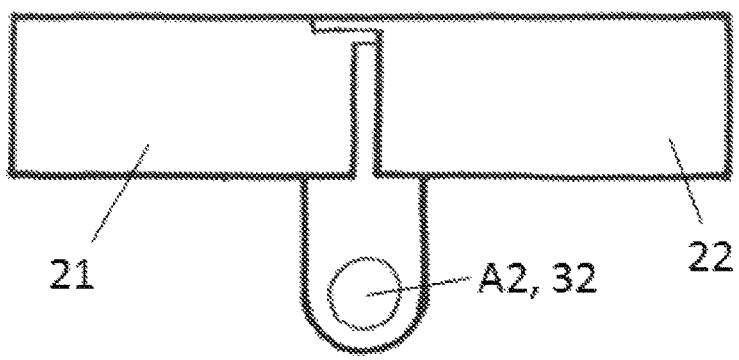
FIGS. 4A-4C are front elevation views of the support tracks and a part of the mounting assembly of the 3D scanning system, showing different roll angles of the support tracks.
Figure 4B:
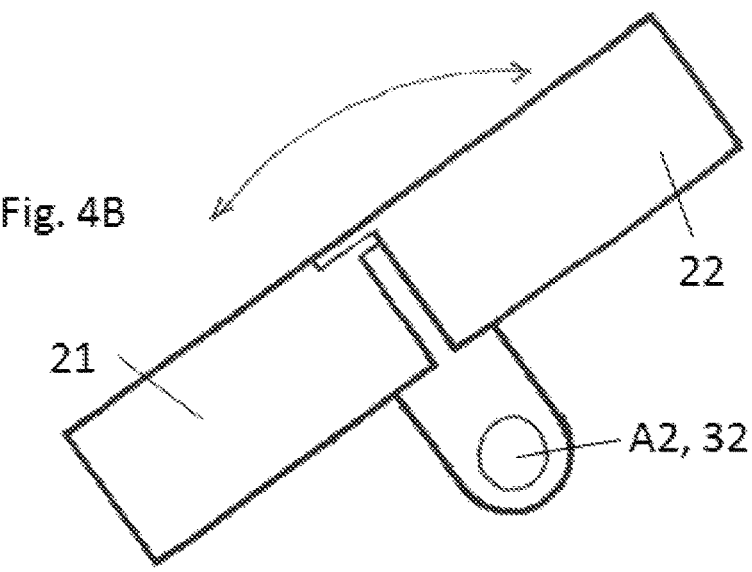
Figure 4C:
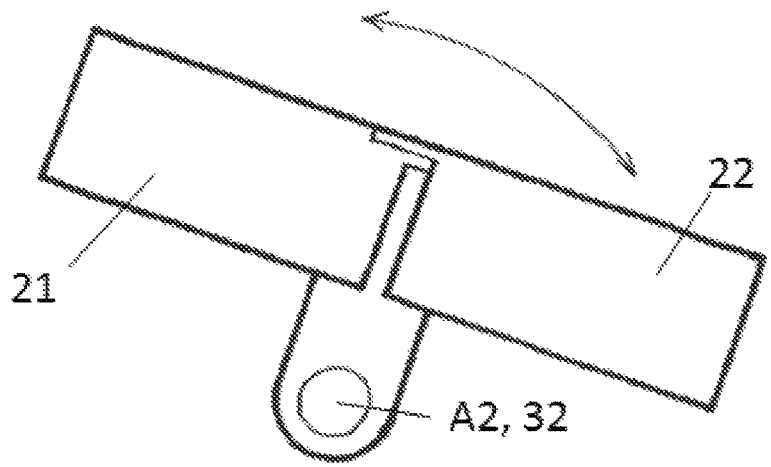

Second, as illustrated in FIGS. 4A-4C, which are front elevation views of the support tracks and a part of the mounting assembly, with FIG. 4A being when the 3D scanner support structure is in the configuration shown in FIG. 1, the mounting assembly 30 supports the support tracks 21, 22 as a whole to rotate around a second axis A2, which is a front-back horizontal axis in the configuration of FIG. 1. This allows the roll angle of the support tracks to change.

Figure 5A:
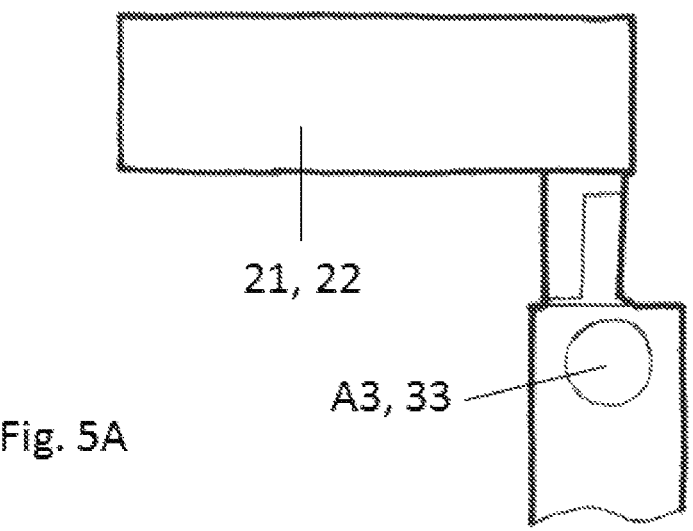
FIGS. 5A-5B are side elevation views of the support tracks and a part of the mounting assembly of the 3D scanning system, showing different pitch angles of the support tracks.
Figure 5B:
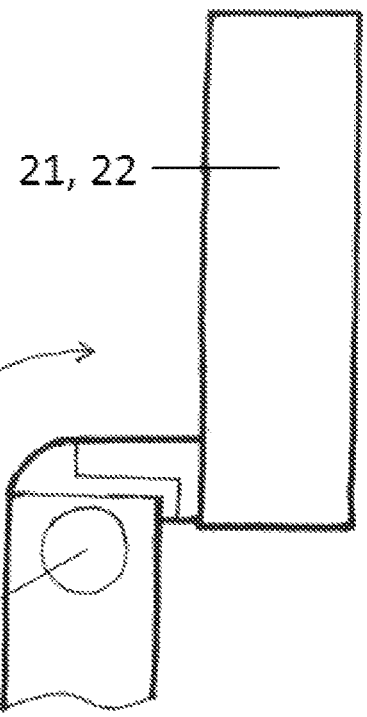
Figure 8A:
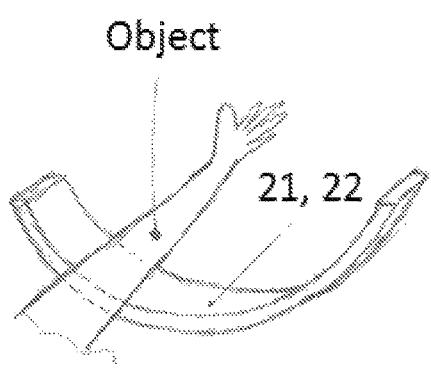
FIGS. 8A-8B schematically illustrate use scenarios of the 3D scanning system.
Figure 8B:
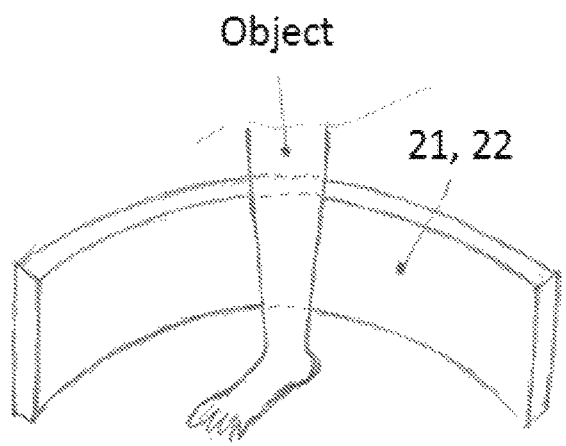

Third, as illustrated in FIGS. 5A-5B, which are side elevation views of the support tracks and a part of the mounting assembly, with FIG. 5A being when the 3D scanner support structure is in the configuration shown in FIG. 1, the mounting assembly 30 supports the support tracks 21, 22 as a whole to rotate around a third axis A3, which is a left-right horizontal axis in the configuration of FIG. 1. This allows the pitch angle of the support tracks to change. The practical effect of this rotation of the support tracks is schematically illustrated in FIGS. 8A-8B. FIG. 8B illustrates the support tracks 21, 22 being in the configuration shown in FIG. 5A (and FIG. 1), where the support tracks and the depth sensors (not shown in FIG. 8B) generally face the front direction and a leg of the patient can be conveniently placed vertically in front of the 3D scanning system for scanning. FIG. 8A illustrates the support tracks 21, 22 being in the configuration shown in FIG. 5B, where the support tracks and the depth sensors (not shown in FIG. 8A) generally face upwards and an arm of the patient can be conveniently placed horizontally in front of the 3D scanning system for scanning.

The mounting assembly 30 is described in detail below with reference to FIG. 2, which is an exploded view of the 3D scanning system. However, it should be understood that the structure of the mounting assembly 30 is not limited to that shown in FIG. 2. All directional terms in the descriptions below are with respect to the configuration shown in FIG. 1.

The mounting assembly 30 includes a first rotational shaft 31 disposed vertically. An upper part 311 of the first rotational shaft 31 passes through the through holes 211, 221 which are respectively located on the support tracks 21, 22 at their proximal ends. A stopper 313 may be affixed to the end of the shaft 31 to secure it in the through holes. The first rotational shaft 31 supports the rotational freedom of the support tracks 21, 22 around the first axis A1 as illustrated in FIGS. 3A-3B.

A lower part of the first rotational shaft 31 is disposed in contact with or inside the upper part of a mounting block 34. The lower part of the first rotational shaft 31 has a through hole 312 extending in the horizontal front-back direction, which is aligned with a through hole 341 in the upper part of the mounting block 34 extending in the same direction. A second rotational shaft 32 passes through the through holes 312 and 341. A stopper 321 may be affixed to the end of the shaft 32 to secure it in the through holes. The second rotational shaft 32 supports the rotational freedom of the support tracks 21, 22 (along with the first rotational shaft 31) around the second axis A2 as illustrated in FIGS. 4A-4C. This rotation is relative to the mounting block 34 which does not rotate around the second axis A2.

A lower part of the mounting block 34 is accommodated inside a slot 11 of, or disposed in contact with a part of, the base stand 10. The lower part of the mounting block 34 has a through hole 342 extending in the horizontal left-right direction, which is aligned with a through hole 12 in the base stand 10 extending in the same direction. A third rotational shaft 33 passes through the through holes 342 and 12. A stopper 331 may be affixed to the end of the shaft 33 to secure it in the through holes. The third rotational shaft 33 supports the rotational freedom of the support tracks 21, 22 (along with the first rotational shaft 31 and the mounting block 34) around the third axis A3 as illustrated in FIGS. 5A-5B. This rotation is relative to the base stand 10 which does not rotate around the third axis A3.

The rotations of the support tracks around the first, second and third rotation axis described above may be done manually by the operator. The rotational shafts 31, 32 and 33 and the corresponding through holes may be provided with suitable damping structures so that the relative rotational position of the components are maintained when no external force except for gravity is applied to the components. For example, the various components may be made of a material that has sufficiency friction, and sized to fit each other tightly to provide friction. Alternatively, set screws with hand knobs or other means may be provided to lock and unlock the rotation of the various components around the rotational shafts.

The above described structure of the mounting assembly 30 is only exemplary and not limiting. Alternative structures may be used to support the three degrees of rotational freedom illustrated in FIGS. 3A-5B. For example, the front-back through hole 341 of the mounting block 34 may be located below the left-right through hole 342. In other examples, one or more universal joints may be used.

Moreover, the mounting assembly 30 may be structured to support only some of these degrees of rotational freedom. For example, it may be structured to support only the relative rotation of the two support tracks around the first axis A1 and the change of the pitch angle around the third axis A3, but provide no rotational freedom to change the roll angle around the second axis A2.

Each support track 21/22 and the corresponding sensor holder 41/42 have structures that cooperate with each other to allow the sensor holder to move along a predefined path. In the embodiment illustrated in FIG. 1, and shown in more detail in FIG. 7 which is a schematic illustration of the structure of the sensor holder, the support track 21/22 and the sensor holder 41/42 both have a C shape in the vertical cross-sectional view; but this shape is not essential. For example, rather than a C shape, the support track 21/22 may have top and bottom rails with multiple struts or brackets to keep them parallel to each other. In the embodiment illustrated in FIGS. 1 and 7, the sensor holder 41/42 is restrained to move along the support track 21/22 by a circular arc shaped groove 212 in the support track and protruding wheels 411 at the bottom of the sensor holder that fit in the groove. Alternatively, the support track and the sensor holder may use a sliding engagement, gears, or any other suitable structures.

A drive mechanism is provided on the support track 21/22 and/or the sensor holder 41/42 to drive the sensor holder to move along the support track. In the embodiment illustrated in FIG. 7, a stepping motor 412 is provided on the sensor holder 41 to drive a gear (pinion) 413, which meshes with a gear rack 214 of the support track. While in the structure shown in FIG. 7 the rotation axis of the gear 413 is shown as being horizontal, the gear 413 may be oriented to rotate around a vertical axis and the gear rack 214 may correspondingly faces the front direction. In an alternative embodiment (not shown), a stepping motor is provided on the support track to drive a looped gear chain, which meshes with a gear (sprocket) provided on the sensor holder. In yet another embodiment (not shown), a looped cable is provided on the support track and attached to both ends (left and right) of the sensor holder, and the cable is driven by a motor on the support track to pull the sensor holder in the left and right directions. Other suitable drive structures may be used to move the sensor holder along the support track.

A controller may be provided to control drive mechanism. The use of the stepping motor allows for accurate control of the position of the sensor holder along the support track. Optionally, an encoder, such as a rotary encoder or linear encoder, may be used to detect the position of the sensor holder along the support track. As will be described later, knowledge of the position of the sensor holder along the support track facilitates the computation of the 3D surface reconstruction.

Figure 7:
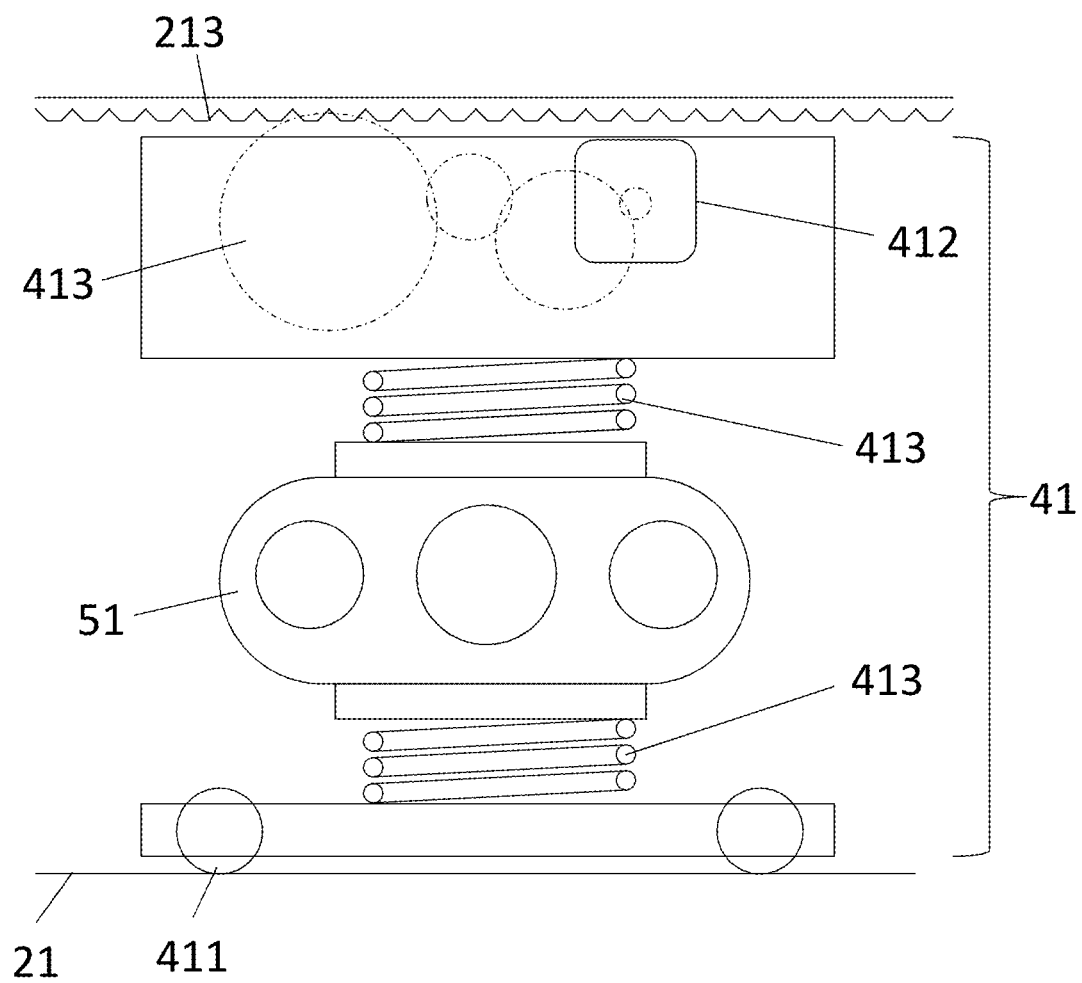
FIG. 7 is a schematic front view illustration the structure of the sensor holder of the 3D scanning system according to an embodiment of the present invention.

In the embodiment shown in FIG. 7, the sensor holder 41 uses a spring-loaded clamp having one or two sprints 413 to conveniently hold the depth sensor 51. This allows for depth sensors of different sizes to be conveniently mounted on the sensor holder. In alternative embodiments, other suitable holding structures such as screws, snaps, buckles, magnets, etc. may be used to secure the depth sensor to the sensor holder.

Figure 6A:
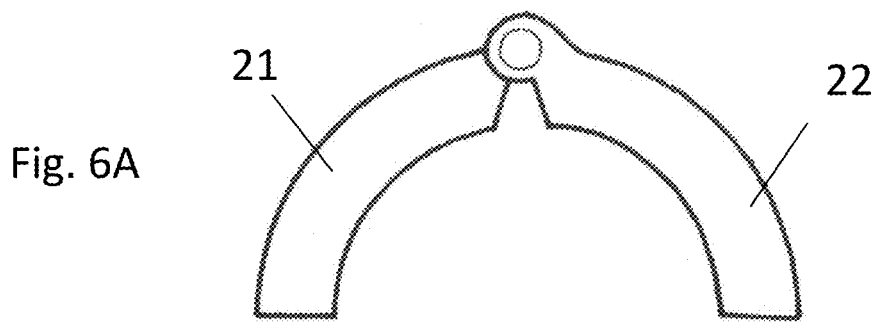
FIGS. 6A-6C are top views of the support tracks and track attachments/extensions of the 3D scanning system.
Figure 6B:
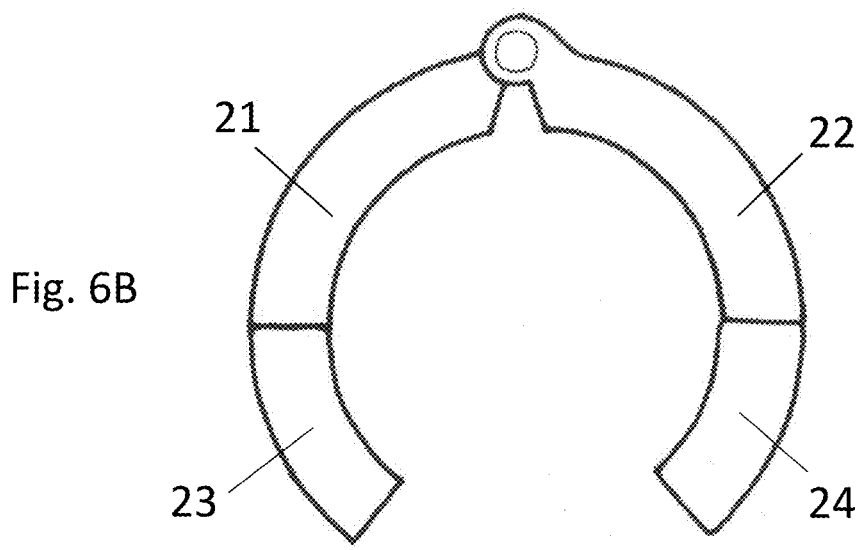
Figure 6C:
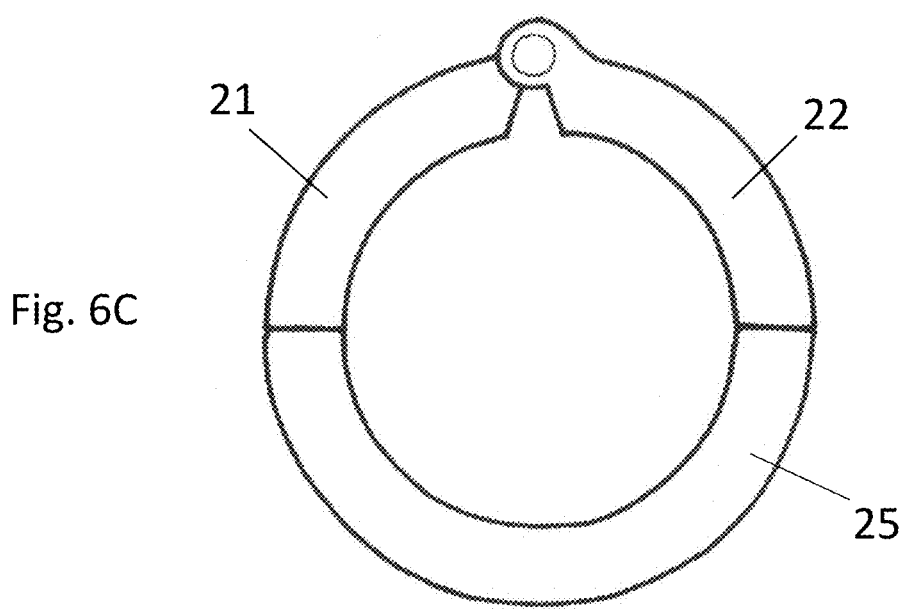

The lengths and curvatures of the support tracks 21, 22 may be selected based on practical considerations. In one embodiment, schematically shown in FIG. 6A (top view), the two support tracks together form approximately a half circle. Optionally, as shown in FIGS. 6B and 6C, additional track sections 23, 24 may be attached to the distal ends of the original support tracks 21, 22, respectively, or an additional track section 25 may be attached to the distal ends of both original tracks 21, 22 to form a complete circle. Aby suitable structure may be used to attach the additional track sections to the support tracks 21, 22, such brackets attached to both pieces, slots and protrusions engaging with each other, etc. The attachable/detachable tracks make the overall system more versatile for scanning different sized objects, and also makes the system more portable.

Figure 2:
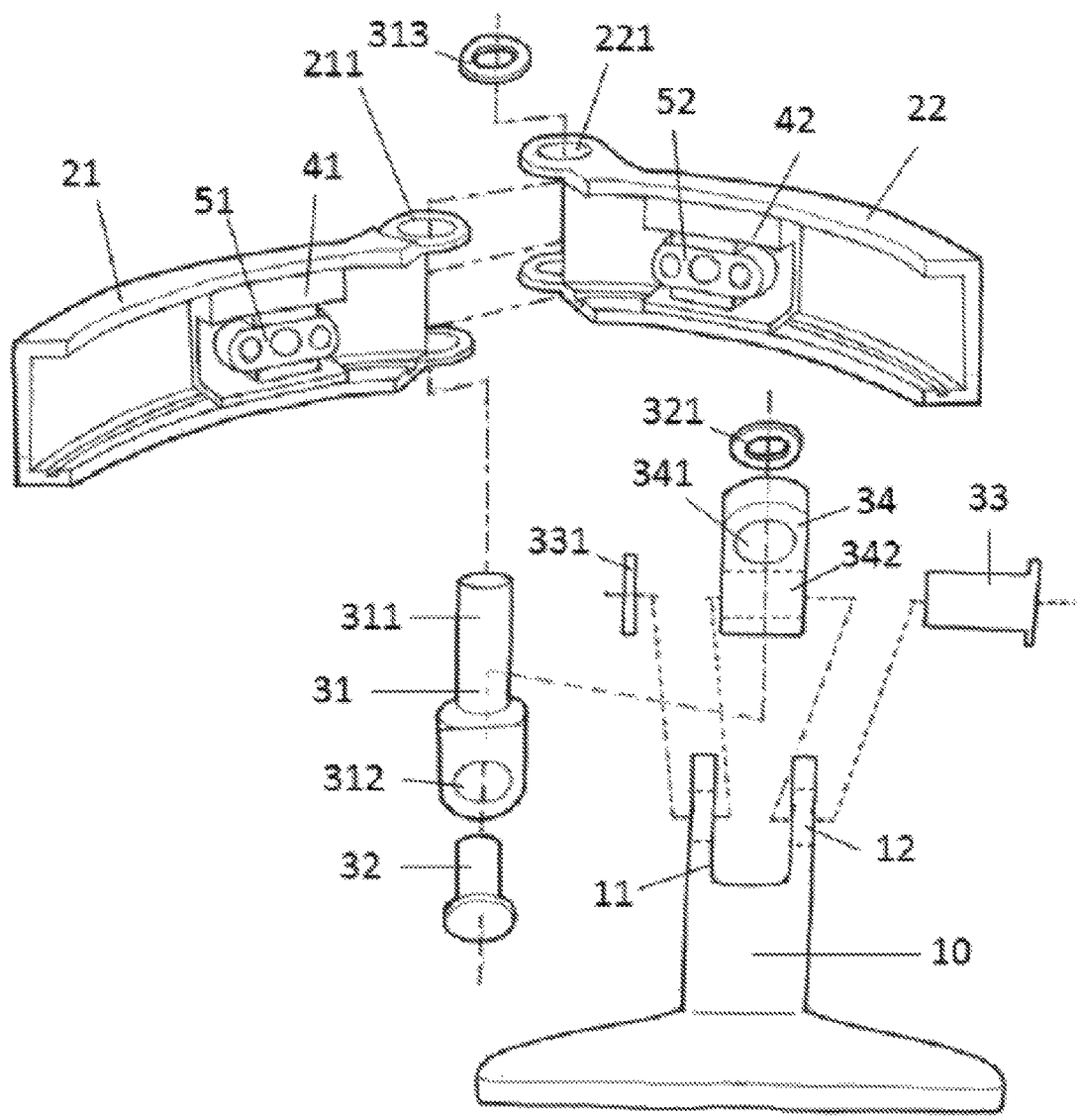
FIG. 2 is an exploded view of the 3D scanning system of FIG. 1.

In the embodiments of FIGS. 1 and 2, two depth sensors 51, 52 are independently provided on the two support tracks. Alternatively, the two support tracks may be one unitary and continuous track, and one or more sensor holders may be provided to move along the unitary track.

Using two depth sensors can reduce the time required to obtain a 3D scan. When two sensors are used, they need to be calibrated before their images can be used together to generate one 3D reconstruction of the object. This is because the relative position and orientation of the two depth sensors (each depth sensor is a camera with an imaging surface) are dependent on the configuration of the support tracks and the two sensor holders, and potentially also the ways the two sensors are held on the sensor holders; the relative position and orientation may not be known or conform to a predefined setting. As a result, there is an external rotation and translation between the two depth sensors which need to be determined. Further, the two cameras may have different intrinsic camera parameters. For these reasons, calibration is needed before 3D scanning is carried out.

According to an embodiment of the present invention, calibration is performed using a reference object and each depth sensor capturing data of the same reference object, with the two depth sensors located at their respective predefined positions referred to as the initial positions. Preferably, the initial positions are as close as practical to the first rotation axis A1, so that the distance between the two depth sensors is as small as practical, which facilitates the calibration calculations. The calibration is performed for a particular opening angle of the two support tracks; when the opening angle changes, for example when the support tracks are changed from the configuration of FIG. 3A to that of FIG. 3B, calibration needs to be performed again.

Each depth sensor produces a point cloud P (a point cloud is a set of data points in a 3D space) by mapping the depth frame (a depth frame is a 2D image in which each pixel value represents the depth of the corresponding point on the object) to camera space points (the camera space points are the 3D positions of the data points in the camera's coordinate system). Because the initial positions of the two sensors are sufficiently close to each other and the two sensors are approximately at the same height, it can be expected that the two point clouds obtained by the two sensors have substantial overlap with each other, meaning the points in the first point cloud are likely to have corresponding points in the second point cloud located at a relatively small distance from each other. The first step of the calibration is to match the points of the two point clouds. For example, using the first sensor's point cloud $P_1$ as a reference point cloud, a linear nearest neighbor search is performed in the second sensor's point cloud $P_2$, to find the matching points between two point clouds. More specifically, taking each point in the reference point cloud $P_1$ as a query point, a search for the nearest point in the second point cloud $P_2$ is performed inside a radius R from the position corresponding to the query point. If for a query point p an R-near neighbor point q is found, then p and q are matched points (if multiple R-near neighbor points are found, the nearest one is considered the matching point); otherwise, no matching point exists within radius R. A set of points p in the first (reference) point cloud and a corresponding set of points q in the second point cloud are found by this step. The coordinates of each set of points are defined in the respective sensor's coordinate system.

The second step of the calibration is to find the various parameters for each of the two sensors using the matching points between the two point clouds. Each matching point between the first sensor (reference) and the second sensor as 3D points in the world reference are denoted (x, y, z), and the 2D projection of the point on the image plane of a camera (first or second sensor) is denoted (u, v). In the following equations, the camera coordinate can be used as the world coordinate. Define $$P_w = \begin{bmatrix} x \\ y \\ z \\ 1 \end{bmatrix}$$

and $$U = \begin{bmatrix} v \\ v \\ 1 \end{bmatrix}$$

The mapping between $P_w$ and U is given by the following equation:

$$\lambda U = [K \ 0] \begin{bmatrix} R & t \\ 0^T & 1 \end{bmatrix} P_w$$

Where $\lambda$ is a scalar parameter; K (a 3×3 matrix) is the intrinsic parameters matrix for the sensor (camera), which is constructed from the focal length, relative aspects of the pixels, skew in the shape of the pixel, and coordinates of the image center; R is 3×3 rotation matrix which describes the sensor orientation; t is a translation vector (3×1 matrix) that describes the position of the camera in the world reference; 0 is a 3×1 zero matrix, and $0^T$ is a 1×3 zero matrix. Since the positions of the points in world reference (x, y, z) and the 2D projection (u, v) of the point on the camera image plane are known for each camera, these parameters $\lambda$, K, R, and t for each camera can be solved by using the above equation and the set of points. The parameters can then be used for 3D reconstruction.

The above calibration process is for calibrating the two different depth sensors with respect to each other. For each sensor, the positions and orientations of the sensor when it is located at different positions along the support track are related to each other by translations and rotations. The mathematical transforms that relate each position to a neighboring position or to a reference position (i.e. the position closest to the first axis A) may be determined once and used for all 3D scans regardless of the configuration of the support tracks. This is referred to as the internal calibration for each track; it may use a method similar to the calibration described above, but the intrinsic camera parameters (matrix K) is kept a constant.

Thus, for a particular opening angle of the two support tracks, the calibration of the two depth sensors relative to each other only need to be performed once with the two sensors at the respective initial positions. When each depth sensor moves along its corresponding support track to perform 3D scanning, the sensor generates and saves a series of data sets obtained from a series of positions along the support track. The series of surface data are in the image space of the sensor. The transforms determined by the internal calibration for each support tract may be applied to the data sets. As explained earlier, the transforms applied to the data sets for the same sensor only depend on the relative positions of the sensor along the support tract, and is independent of the orientation of the support tracks themselves.

Figure 9:
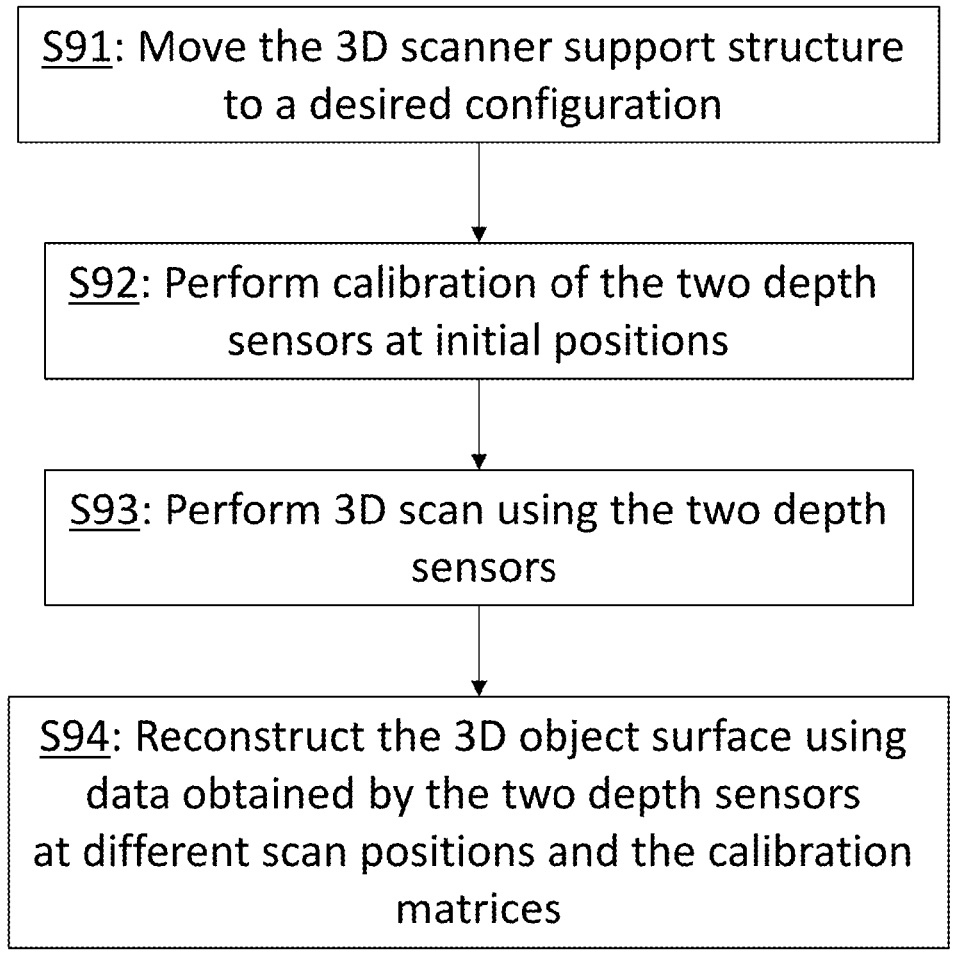
FIG. 9 schematically illustrates a scanning and 3D surface reconstruction process according to another embodiment of the present invention.

The scanning process using the 3D scanning system is summarized in FIG. 9. First, the 3D scanner support structure, with the two depth sensors mounted on the two sensor holders, is moved to a desired configuration, i.e. at desired opening angle, roll angle and pitch angle (step S91). Then, calibration of the two sensors is performed with the two sensor holders locater at their initial positions at the desired configuration, using a reference object (step S92). 3D scanning of the target object is then performed by placing the target object (stationary) in front of the depth sensors, and moving the sensor holders (carrying the depth sensors) along the respective support tracks and taking depth measurements at a series of positions (step S93). The scanning of the two sensors can performed simultaneously, with the sensors moving in opposite directions. The 3D surface of the object is then reconstructed using the data obtained at the series of positions (step S94). In the reconstruction step S94, the calibration of the two depth sensors obtained in step S92 and the internal calibration of the same sensor at different positions of the support track are used.

The data processing steps in the above process may be performed by any suitable data processing system, such as a computer system having a processor and non-transitory memories storing software programs, where the software programs can be executed by the processor to perform the above-described data processing steps.

With such a system and scanning process, the exact sensor pose and position of scan positions relative to the first scan (at the initial position) can be readily known so that computing a surface normal map and alignment of multiple viewpoint depth maps become easier and computationally efficient.

The 3D scanning system and the scanning process described above have the following advantages.

The 3D scanning system can use one or two portable/handheld depth sensors, such as structured light sensors, which are readily available commercially. This makes the system more flexible in terms of the choice of sensors, and achieves a low-cost 3D scanning system that can accurately and quickly reconstruct 3D surfaces. The depth sensors are movable along the support tracks which facilitates image capture of the object from different angles to achieve a full 3D surface. The system can be used in 3D modeling applications where the target object cannot be conveniently placed on a rotatable platform, e.g., scanning of human limbs. The scanner can achieve fast 3D measurements by one scan, which is greatly beneficial for an object that cannot be held still for a long time. The system can use either one or two sensors. When two sensors are used, they can move simultaneously in opposite direction to speed up the capture of depth maps. The 3D scanning system and the scanning process can generate a continuously smooth 3D surface by only using depth data from one or two sensors. To the contrary, in a manual operation where the operator manually holds a handheld scanner and moves it to different viewpoints around the target object, because the position and orientation of the handheld scanner is much less controllable, the data obtained at different viewpoints are much more difficult to stitch together to form a smooth 3D surface.

The 3D scanner support structure can be adjusted with many degrees of freedom, allowing the depth sensors to have desired orientations so that the target object can be imaged by the scanner from desired viewpoints. For example, the support tracks can be tilted in different angles, such as facing upward or facing sideways, to accommodate different positions and orientations of the target object. The opening angle of the two support tracks is adjustable, so that the system is more suitable for different size of objects, especially when there is occlusion among objects. The 3D scanner support structure may use attachable/detachable tracks, which makes the system extendable and also more portable.

It will be apparent to those skilled in the art that various modification and variations can be made in the 3D scanning system and related scanning method of the present invention without departing from the spirit or scope of the invention. Thus, it is intended that the present invention cover modifications and variations that come within the scope of the appended claims and their equivalents.

What is claimed is:

1. A scanner support structure for a 3D scanning system, comprising:
   a base stand;
   two support tracks, each having a circular arc shape when viewed along a first direction;
   a mounting assembly for mounting the two support tracks to the base stand, the mounting assembly including a first rotational shaft extending in the first direction and engaging each support track at a proximal end, for supporting a rotation of each support track around the first rotational shaft; and
   two sensor holders, each being moveably mounted on one of the two support tracks and being moveable in a circular arc shaped path along the respective support track, each sensor holder having a holding structure adapted for holding a depth sensor.

2. The scanner support structure of claim 1, wherein the mounting assembly further includes a second rotational shaft extending in a second direction perpendicular to the first direction, the second rotational shaft engaging the first rotational shaft, for supporting a rotation of the two support tracks around the second rotational shaft.

3. The scanner support structure of claim 2, wherein the mounting assembly further includes a third rotational shaft extending in a third direction perpendicular to both the first direction and the second direction, the third rotational shaft engaging the second rotational shaft, for supporting a rotation of the two support tracks around the third rotational shaft.

4. The scanner support structure of claim 1, wherein each support track includes a circular arc shaped groove, and each sensor holder includes a plurality of protruding wheels at its bottom that fit in the groove of the corresponding support track.

5. The scanner support structure of claim 1, further comprising a drive mechanism, disposed on either the two support tracks, or the two sensor holders, or both the two support tracks and the two sensor holders, for driving the two sensor holders to move respectively along the two support tracks.

6. The scanner support structure of claim 5, wherein the drive mechanism includes a gear rack on each of the two support tracks, a stepping motor and a gear wheel on each of the two sensor holders, each gear wheel engaging the respective gear rack, each stepping motor configured to drive the respective gear wheel.

7. The scanner support structure of claim 5, wherein the drive mechanism includes a loop cable connected to two opposite ends of each sensor holder, and a motor for driving the loop cable to pull the sensor holder.

8. The scanner support structure of claim 1, wherein the holding structure of each sensor holder includes a spring loaded clamp.

9. A method for obtaining 3D (three-dimensional) surface data of a target object, comprising:
   providing a 3D scanning system, the system comprising:
      a base stand;
      two support tracks, each having a circular arc shape, mounted on the base stand, the two support tracks being rotatable relative to each other around a first rotation axis located near respective proximal ends of the two support tracks;
      two sensor holders, each being moveably mounted on one of the two support tracks and being moveable in a circular arc shaped path along the respective support track; and
      two depth sensors, each being held on a respective one of the two sensor holders;
   rotating the two support tracks around the first rotation axis to set a relative rotation angle of the two support tracks;
   moving the two sensor holders to respective initial positions near the respective proximal ends of the support tracks;
   calibrating the two depth sensors using a reference object placed in front of the two depth sensors held on the two sensor holders, by obtaining 3D surface data of the reference object using the two depth sensors at the initial positions, and processing the 3D surface data to generate calibration parameters;
   placing the target object in front of the two depth sensors and keeping the target object stationary;
   while maintaining the relative rotation angle of the two support tracks, moving the two sensor holders along the respective support tracks to a plurality of different positions and obtaining 3D surface data of the target object using the two depth sensors from the different positions; and
   constructing a 3D surface of the target object using the calibration parameters and the 3D surface data obtained by the two depth sensors from the different positions.

10. The method of claim 9, wherein in the calibration step, the step of processing the 3D surface data to generate calibration parameters includes:
- generating a first and a second point cloud respectively from the 3D surface data obtained by a first and a second one of the two depth sensors;
- obtaining matching points in the first and second point clouds that match each other; and
- using coordinates of the matching points in the coordinate system of the respective depth sensors and 2D (two-dimensional) projection of the matching points on image planes of the respective depth sensors, calculating an intrinsic parameters matrix, a rotation matrix, and a translation vector for each of the two depth sensors.

11. The method of claim 9, further comprising, for each of the two depth sensors:
- before the constructing step, calibration the depth sensor to obtain a translation and a rotation for each of the plurality of different positions relative to the initial position of the depth sensor or relative to another one of the plurality of different positions.

* * * * *